US009943090B2

(12) United States Patent
Schilling

(10) Patent No.: US 9,943,090 B2
(45) Date of Patent: Apr. 17, 2018

(54) HYGIENIC OVEN COOKING SYSTEMS AND METHODS

(71) Applicant: Convotherm Elektrogeraete GmbH, Eglfing (DE)

(72) Inventor: Michael Schilling, Peissenberg (DE)

(73) Assignee: CONVOTHERM ELEKTROGERAETE GMBH, Eglfing (DE)

( * ) Notice: Subject to any disclaimer, the term of this patent is extended or adjusted under 35 U.S.C. 154(b) by 178 days.

(21) Appl. No.: 14/680,187

(22) Filed: Apr. 7, 2015

(65) Prior Publication Data

US 2016/0296055 A1 Oct. 13, 2016

(51) Int. Cl.
A47J 37/08 (2006.01)
A23L 1/01 (2006.01)
A47J 27/14 (2006.01)

(52) U.S. Cl.
CPC ............... *A23L 1/01* (2013.01); *A47J 27/14* (2013.01)

(58) Field of Classification Search
CPC .. A23L 1/01; A47J 27/05; A47J 27/082; A47J 27/12; A47J 27/14; A47J 27/16; A47J 36/34; A47J 47/14
USPC ......... 99/325–327, 331, 337, 338, 485, 489, 99/492
See application file for complete search history.

(56) References Cited

U.S. PATENT DOCUMENTS

2013/0302483 A1* 11/2013 Riefenstein ............. F24C 7/085
426/233

FOREIGN PATENT DOCUMENTS

WO 198911066 A1 11/1989
WO 2011107085 A1 9/2011

OTHER PUBLICATIONS

International Search Report dated Feb. 1, 2016 for PCT application No. PCT/IB2015/052499.
Written Opinion Report dated Feb. 1, 2016 for PCT application No. PCT/IB2015/052499.

\* cited by examiner

*Primary Examiner* — Dana Ross
*Assistant Examiner* — Brandon Harvey
(74) *Attorney, Agent, or Firm* — Ohlandt, Greeley, Ruggiero & Perle, LLP

(57) ABSTRACT

Disclosed are methods and system for reducing or eliminating the possibility of cross-contamination between food to be cooked in a cooking device and food cooking in the cooking device. The methods and systems determine the placement into a cooking device of food product to be cooked by the distance sensor, determine a hygienic safe cooking time (HSCT) for that product based on the identification of food product to be cooked, and compare the HSCT to one or more remaining cooking times of food product cooking in the cooking device on levels below and/or above the desired placement of the food product to be cooked. Various methods of identifying the food to be cooked may be employed, both manual and automatic. As a result of the comparison, the methods and systems of the disclosure can identify safe carrier/tray level(s) for accepting placement of the food to be cooked.

14 Claims, 7 Drawing Sheets

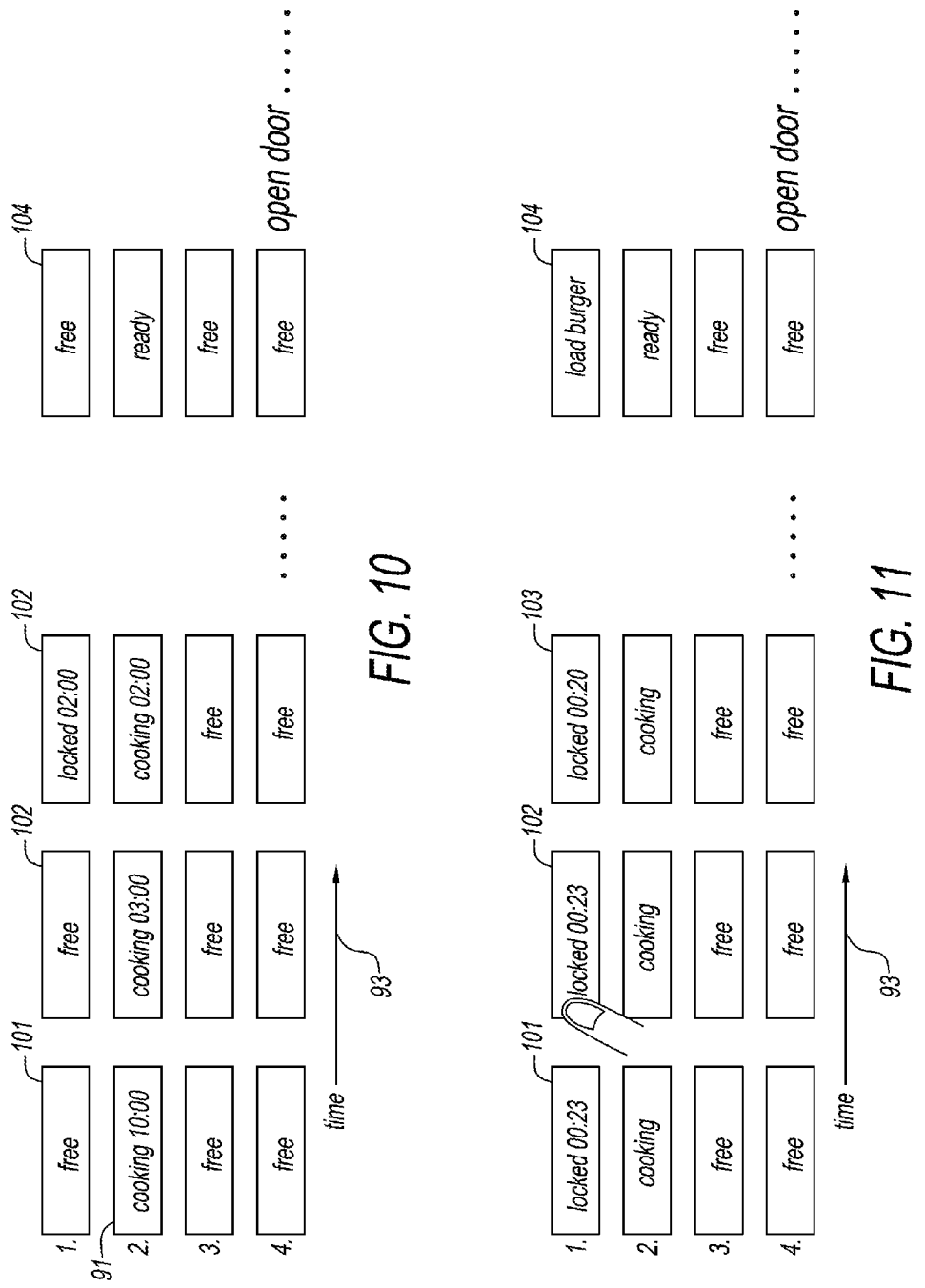

HYGIENIC OVEN COOKING SYSTEMS AND METHODS

BACKGROUND OF THE DISCLOSURE

1. Field of the Disclosure

The present disclosure relates to cooking devices and methods of operating such cooking devices. In particular, the present disclosure relates to cooking devices and methods for cooking food product in such cooking devices in a hygienic manner to reduce, avoid or eliminate the possibility of cross-contamination of food product being cooked by providing systems and methods for cooking devices that prevent an operator from, or alert the operator to avoid, placing a food product to be cooked in a location in the cooking device that could cause cross-contamination of one or more food products already subject to cooking cycle(s) in the cooking device. The systems and methods of the present disclosure confer safety and health benefits to the operation of the cooking devices and to the consuming public.

2. Background of the Disclosure

The use of a combisteamer (or cooking device) for the cooking of food products in quick-service restaurants and other commercial cooking establishments for processing food products has become very well-established. Combisteamers are generally designed to cook food products using heat, steam or a combination of heat and steam, the specific combinations of which depend upon the food product to be cooked. Combisteamers are also generally designed with a plurality of levels for holding food carriers/trays, and are generally operated with all levels fully occupied. Combisteamers are often used to cook several different food products simultaneously. The food product(s) can be loaded into and unloaded from the combisteamer in either a "batch" or "rolling" cooking process.

In a "batch" cooking process, in general, food products that can be cooked at the same temperature for approximately the same amount of time are placed in the cooking device, cooked, and removed from the cooking device when the cooking cycle (time duration/temperature of a cooking program) is complete, usually at about the same time. In the case of "batch" cooking processes, the possibility of cross-contamination of food products being cooked is not of great concern because, generally, the same or closely associated food products are placed into and removed from the cooking device substantially concurrently.

In a "rolling" cooking process, food product(s) to be cooked and food product(s) that are finished cooking are placed in and removed from the cooking device, respectively, at different times and at different levels in the cooking device, depending upon the availability of an open or "free" carrier/tray level(s) in the cooking device in which to place a carrier/tray holding food product to be cooked. In a "rolling" cooking process, different food products may be placed above or below food products in various stages of a cooking cycle. For example, even if several different food products have cooking cycles begun at the same time (for example, bread, chicken and roast beef), each will have a different removal time. This leaves one or more carrier/tray levels in the cooking device likely to be "free" for accepting a new food product to be cooked before others are done.

The "rolling" cooking process introduces a food risk by what is known as cross-contamination. As can be appreciated, in a "rolling" cooking process, loading a cold food product to be cooked at a carrier/tray level in the cooking device above that of a food product already in its cooking cycle can lead to food product condensates (i.e., fluids) dripping from the food product on the upper carrier/tray to food product on the lower carrier(s)/tray(s) that is/are still in the process of cooking. In short, cross-contamination will or may occur where fluid from a food product on upper carrier/tray drips onto food product on a lower carrier(s)/tray(s). Subsequent to fluids dripping from an upper carrier/tray to a lower carrier(s)/tray(s), if the "dripped-on" food product has a remaining cooking time that is insufficient to kill or render harmless pathogens present in the dripped fluids, cross-contamination may occur. An example of such a pathogen would be salmonella in the fluid from a poultry product (such as chicken) dripping onto a beef roast that will be removed from the cooking device in a time period too short for the cooking environment to kill the salmonella.

The above problem of cross-contamination was recognized in patent application number WO 2011107085. This application purports to have solved the issue of cross-contamination using sheet metal barriers between cooking levels in the cooking device. Disadvantages of this solution are that additional hardware for the cooking device, and/or additional handling of the food products, may be necessary. Also, the use of trays between the cooking levels may reduce space for cooking trays, thus reducing the utilization of the cooking device.

As can be seen from the above, although cross-contamination has been recognized in food cooking, very little attention has been paid to systems and methods for the operation of a cooking device that can reduce or prevent the possibility of cross-contamination. Indeed, systems and methods that simplify the recognition and reduction/prevention of cross-contamination for operators of cooking devices are needed.

SUMMARY OF THE DISCLOSURE

It is an object of the present disclosure to provide systems for and methods of operating a cooking device that reduce/prevent the possibility of cross-contamination between food products to be cooked and those that are in the process of cooking in the cooking device.

It is also an object of the present disclosure to provide systems for and methods of operating a cooking device that reduce/prevent the possibility of cross-contamination between food products to be cooked and those that are cooking in the cooking device by simplifying the recognition of the possibility of cross-contamination for operators of the cooking device.

Is a further object of the present disclosure to provide systems for and methods of operating a cooking device that reduce/prevent the possibly of cross-contamination between food product to be cooked and those that are cooking in the cooking device by providing a warning to an operator of the cooking device of the possibility of cross-contamination and/or prevent an operator of the cooking device from performing an activity that could lead to cross-contamination.

It is a still further object of the present disclosure to provide systems and methods of operating a cooking device that reduce/prevent the possibility of cross-contamination between food products to be cooked and those that are cooking in the cooking device that avoid the use of additional hardware for the cooking device and/or additional handling of the food products.

As mentioned above, in a "rolling" cooking process, cooked food products are removed at staggered time intervals from different levels, making room for new food products to be cooked. In general, as new food product(s) is/are to be placed into the cooking device, (1) the new food product that will be placed into the cooking device is identified and (2) the cooking cycle for the new food product is provided/selected. Once the identity and cooking cycle of the new food product are known, the level at which the food product is to be placed needs to be selected. This is where the possibility of cross-contamination arises. The present disclosure provides for the reduction or elimination of the possibility of cross-contamination.

According to the present disclosure, associated with each food product is a parameter referred to herein as "hygienic safe control time" ("HSCT"). The HSCT is a time assigned to a food product to be cooked that indicates the minimum remaining cooking time for a food product cooking on levels below, preferably the level immediately below, the selected level of the food product to be cooked. For example, chicken may have an HSCT of 6 minutes, hamburgers 4 minutes and roast beef 2 minutes, meaning that the food cooking at a level(s) below the level where chicken is to be placed must have 6 minutes of cooking time remaining, below hamburgers 4 minutes and below roast beef 2 minutes. The HSCT is not necessarily different for each food product to be cooked. For example, the HSCT could be (1) a fixed value (e.g., the time for the food product having the longest HSCT (i.e., chicken in the above example) and used for every food product and/or cooking cycle/program and/or recipe, (2) a specific, individual HSCT for each recipe (e.g., food product to be cooked, prevailing oven temperature, etc., as a script language in the recipe name), (3) automatically calculated by the unit itself due to the cooking cycle duration, and/or remaining time and/or cooking temperature, and/or cooking algorithm and/or specific used unit features (e.g., reduced fan speed, reduced power or dehumidification), or (4) a specific and individual HSCT set for each product group (e.g., as a script language in the recipe name, for example "poultry").

One embodiment of the present disclosure provides for a system for reducing or eliminating cross-contamination between food to be cooked in a cooking device and food cooking in the cooking device, the cooking device including a cooking chamber, a door for accessing and closing the cooking chamber, a plurality of mechanisms for receiving and holding a plurality of food product carriers/trays at a plurality of predetermined carrier/tray levels for cooking food, the system comprising a controller having a memory and a user interface including a display and user input device, wherein the system receives an identification of the food to be cooked, obtains an HSCT for the food to be cooked, obtains a remaining cooking time and a carrier/tray level for each food cooking in the cooking device, compares the HSCT to each remaining cooking time, and identifies safe carrier/tray level(s) for accepting placement of the food to be cooked. Preferably, the system receives the identification of the food to be cooked via the user interface. Also preferably, the system obtains an HSCT for the food to be cooked and obtains the remaining cooking time and the carrier/tray level for each food cooking in the cooking device from the memory where (1) HSCTs for foods to be cooked and (2) cooking times and carrier/tray levels for food cooking in the cooking device are stored. Also preferably the system provides the indication of safe carrier/tray level(s) for accepting placement of the food to be cooked on the display. Still preferably, the system further provides an alert to a user if food to be cooked in the cooking device is attempted to be loaded at an unsafe carrier/tray level. Also, preferably, the system further provides for locking the unsafe carrier/tray level(s). In addition, the controller or an associated control compares the HSCT to each remaining cooking time, and identifies safe carrier/tray level(s) for accepting placement of the food to be cooked.

Another embodiment of the present disclosure provides for a method for reducing or eliminating cross-contamination between food to be cooked in a cooking device and food cooking in the cooking device, the cooking device including a cooking chamber, a door for accessing and closing the cooking chamber, a plurality of mechanisms for receiving and holding a plurality of food product carriers/trays at a plurality of predetermined carrier/tray levels for cooking food, the method comprising receiving an identification of the food to be cooked, obtaining an HSCT for the food to be cooked, obtaining a remaining cooking time and a carrier/tray level for each food cooking in the cooking device, comparing the HSCT to each remaining cooking time, and identifying safe carrier/tray level(s) for accepting placement of the food to be cooked. Preferably, the method receives the identification of the food to be cooked via the user interface. Also preferably, the method obtains an HSCT for the food to be cooked and obtains the remaining cooking time and the carrier/tray level for each food cooking in the cooking device from the memory where (1) HSCTs for foods to be cooked and (2) cooking times and carrier/tray levels for food cooking in the cooking device are stored. Also preferably the method indicates safe carrier/tray level(s) for accepting placement of the food to be cooked on the display. Still preferably, the method further provides one or more of an alert to a user if food to be cooked into the cooking device is attempted to be loaded at an unsafe carrier/tray level. In addition, the controller or an associated control compares the HSCT to each remaining cooking time, and identifies safe carrier/tray level(s) for accepting placement of the food to be cooked.

Another embodiment of the present disclosure provides for a subsystem for reducing or eliminating the possibility of cross-contamination between food to be cooked in a cooking device and food cooking in the cooking device, the cooking device including a cooking chamber for cooking food, a plurality of mechanisms for receiving and holding a plurality of food product carriers/trays at a plurality of predetermined carrier/tray levels for cooking food in the cooking device, a user interface having a display and a controller having a memory, the subsystem comprising a processor, and a memory that contains a program embodied therein, wherein the program is readable and executable by the processor to cause the processor to perform actions of receiving an identification of the food to be cooked, obtaining an HSCT for the food to be cooked, obtaining a remaining cooking time and a carrier/tray level for each food cooking in the cooking device, comparing the HSCT to each remaining cooking time, and identifying safe carrier/tray level(s) for accepting placement of the food to be cooked.

Another embodiment of the present disclosure provides for a storage medium that is non-transitory, the storage medium comprising a program embodied therein, wherein the program is readable and executable by a processor to cause the processor to perform the steps of receiving an identification of the food to be cooked, obtaining an HSCT for the food to be cooked, obtaining a remaining cooking time and a carrier/tray level for each food cooking in the cooking device, comparing the HSCT to each remaining cooking time, and identifying safe carrier/tray level(s) for accepting placement of the food to be cooked.

Another embodiment of the present disclosure provides a system for reducing or eliminating cross-contamination between food to be cooked in a cooking device and food cooking in the cooking device, the cooking device including a cooking chamber, a door for accessing and closing the cooking chamber, a plurality of mechanisms for receiving and holding a plurality of food product carriers/trays at a plurality of predetermined carrier/tray levels for cooking food, and a user interface including a display and user input device, the system comprising a digital optical recognition device (DORD), and a controller having a memory, wherein the system captures images of food to be cooked, compares the captured images to stored images of food to be cooked, identifies the food to be cooked, obtains an HSCT for the food to be cooked, obtains a remaining cooking time and a carrier/tray level for each food cooking in the cooking device, compares the HSCT to each remaining cooking time, and identifies safe carrier/tray level(s) for accepting placement of the food to be cooked. The system, optionally, displays identified safe carrier/tray level(s) on the user interface and/or locks unsafe carrier/tray level(s) and/or provides a warning that an unsafe carrier/tray level is attempted to be used. Preferably, the system identifies the carrier/tray level in the cooking device at which food to be cooked is going to be placed. Also preferably, the system identifies the carrier/tray level by capturing an image of a carrier/tray level indicator or by an auto-focus mechanism.

Another embodiment of the present disclosure provides a system for reducing or eliminating cross-contamination between food to be cooked in a cooking device and food cooking in the cooking device, the cooking device including a cooking chamber, a door for accessing and closing the cooking chamber, a plurality of mechanisms for receiving and holding a plurality of food product carriers/trays at a plurality of predetermined carrier/tray levels for cooking food, and a user interface including a display and user input device, the system comprising a distance sensor, and a controller having a memory, wherein the system receives an identification of the food to be cooked, obtains a cooking cycle/program for the food to be cooked, obtains an HSCT for the identified food to be cooked, measures the carrier/tray level at which the food to be cooked will be placed into the cooking device, obtains a remaining cooking time and a carrier/tray level for each food cooking in the cooking device, compares the HSCT to each remaining cooking time, and identifies safe carrier/tray level(s) for accepting placement of the food to be cooked. Optionally, the HSCT is fixed for all food to be cooked in the cooking device. Alternatively, the HSCT is different for each food to be cooked in the cooking device.

Another embodiment of the present disclosure provides a method for reducing or eliminating the possibility of cross-contamination between food to be cooked in a cooking device and food cooking in the cooking device, the cooking device including a cooking chamber for cooking food, a plurality of mechanisms for receiving and holding a plurality of food product carriers/trays at a plurality of predetermined carrier/tray levels for cooking food in the cooking device, a user interface, a controller having a memory, and a DORD, the method comprising capturing images of the food to be cooked, comparing the captured images to stored images of food to be cooked, identifying the food to be cooked, obtaining an HSCT for the food to be cooked, obtains a remaining cooking time and a carrier/tray level for each food cooking in the cooking device, comparing the HSCT to each remaining cooking time, and identifying safe carrier/tray level(s) for accepting placement of the food to be cooked. Optionally, the method further comprises displaying the safe carrier/tray level(s) on the user interface. Also, optionally, the method further comprises locking unsafe carrier/tray level(s) to prevent placement of a carrier/tray holding food to be cooked at an unsafe carrier/tray level. Preferably, the method additionally comprises providing a warning that an unsafe carrier/tray level is attempted to be used.

Another embodiment of the present disclosure provides a subsystem for reducing or eliminating the possibility of cross-contamination between food to be cooked in a cooking device and food cooking in the cooking device, the cooking device including a cooking chamber for cooking food, a plurality of mechanisms for receiving and holding a plurality of food product carriers/trays at a plurality of predetermined carrier/tray levels for cooking food in the cooking device, a user interface, a controller having a memory, and a DORD, the subsystem comprising a processor, and a memory that contains a program embodied therein, wherein the program is readable and executable by the processor to cause the processor to perform actions of instructing the DORD to capture images of the food to be cooked, comparing the captured images to stored images of food to be cooked, identifying the food to be cooked, providing a cooking cycle/program and an HSCT for the identified food to be cooked, providing a remaining cooking time and carrier/tray level for each food cooking in the cooking device, comparing the HSCT to each remaining cooking time and carrier/tray level, and identifying safe carrier/tray level(s) for accepting placement of the food to be cooked. Optionally, the subsystem further causes the processor to perform the action of displaying the safe carriers/trays levels on the user interface. Also optionally, the subsystem further causes the processor to perform the action of locking unsafe carrier/tray level(s). Preferably, the subsystem also causes the processor to perform the action of providing a warning that an unsafe carrier/tray level is attempted to be used.

In a further embodiment, the present disclosure provides a method of identifying safe carrier/tray level(s) in a cooking device having food cooking at a plurality of cooking levels performed by a processor having an associated memory with a program stored therein, the memory having stored remaining cooking time and carrier/tray level for each food cooking in the cooking device, and stored images, cooking cycle(s)/program(s) and HSCTs of food to be cooked, wherein the program is readable and executable by the processor and causes the processor to perform the steps of instructing a DORD to capture images of the food to be cooked, comparing the captured images to the stored images of food to be cooked, identifying the food to be cooked, selecting a cooking cycle/program for the food to be cooked that includes an HSCT, comparing the HSCT of the food to be cooked to each remaining cooking time of food being cooked, and identifying safe carrier/tray levels(s) for accepting placement of the food to be cooked. Optionally, the method further comprises causing the processor to perform the step of displaying the safe carrier/tray level(s) on a user interface. Alternatively, the method further comprises causing the processor to perform the step of locking unsafe carrier/tray level(s). Preferably, the method further comprises causing the processor to perform the step of providing a warning that an unsafe carrier/tray level is attempted to be used.

In a still further embodiment, the present disclosure provides a storage medium that is non-transitory comprising a program embodied therein, wherein the program is readable and executable by a processor to cause the processor to perform the steps of instructing a DORD to capture images of food to be cooked in a cooking device, comparing the captured images to stored images of food to be cooked in the cooking device, identifying the food to be cooked in the cooking device, selecting a cooking cycle/program that includes an HSCT for the food to be cooked in the cooking device, comparing the HSCT to remaining cooking times for each food cooking in the cooking device, and identifying safe carrier/tray levels(s) for accepting placement of the food to be cooked in the cooking device. Optionally, the storage medium further causes the processor to perform the step of displaying the safe carrier/tray level(s) on a display associated with the cooking device. Alternatively, the storage medium further causes the processor to perform the step of locking any unsafe carrier/tray level(s). Preferably, the storage medium according further comprising causing the processor to perform the step of providing a warning that an unsafe carrier/tray level is attempted to be used.

As mentioned above, preferred embodiments of the systems and methods include locking, and/or providing a warning for an attempt to use, unsafe carrier/tray level(s) and comprises one or more of a locking mechanism, an alarm and/or a time display. A locking mechanism may be provided so as to lock unsafe carrier/tray levels(s) such that food to be cooked cannot be placed on those unsafe levels. An alarm may be provided so as to sound an alert (visual, aural, oral or other alert) such that the selection of an unsafe carriers/trays level is clearly indicated. A time display may be provided so as to allow an operator to select an unsafe carrier/tray level such that, upon the selection of an unsafe carrier/tray level, a timer is set. The timer counts down the remaining cooking time for the selected unsafe carrier/tray level and alerts the operator when it is safe to place food on the previously unsafe carrier/tray level.

In conjunction with any of the embodiments of the present disclosure, a food product positioning area may be provided and marked on a front side of the cooking device, to which the field of vision of the DORD is directed. This arrangement simplifies the task of the operator to understand where the food product can be placed to facilitate the recognition of the food to be cooked. In addition, a carrier/tray level marker can be provided, preferably in the cooking chamber or at the carrier/tray level itself, the carrier/tray level marker highlighting carrier/tray levels for the DORD and for the operator. The carrier/tray level marker can, for example, be a strip-like element that is attached along the side of the opening of the cooking chamber at the level(s) of each carrier/tray level, or on each carrier/tray level itself. These locations provide that the view toward the carrier/tray level marker will less likely be obstructed for the field of vision of the DORD. The carrier/tray level marker(s) indicate positions for the carrier/tray levels, and can also indicate the actual level of the carrier/tray, thereby providing one indicia for the carrier/tray level to be determined in those embodiments where the DORD is used both for capturing images and determining carrier/tray level. In this way, it is easier for the controller to evaluate the data from the DORD. The controller is, preferably, programmed to conduct an optical recognition of carrier/tray level(s) in which a carrier/tray is inserted.

The steps of the methods of the present disclosure need not be performed in any particular order. The distance sensor may be activated automatically such as with a motion sensor. In this way, as an operator approaches the cooking device with a food to be cooked on a carrier/tray, the distance sensor will be turned on. Alternatively, the distance sensor may be activated manually. Also alternatively, the images of the food can be captured before the distance sensor is activated. All that is required is that the images should be captured and the food product identified so that the HSCT is determined, and that the safe and unsafe carrier/tray level(s) for placement of the food to be cooked in the cooking device also be known, prior to placement of food to be cooked into the cooking device and initiating the cooking cycle/program for the food to be cooked. Also as mentioned above, either or both of the identification of the food to be cooked and/or of the desired carrier tray level can be received by the systems and used in the methods without the need for the DORD or distance sensor. The systems and methods will still provide safe carrier/tray level placement(s). For example, an operator can enter "whole roasted chicken" as the identification of the food to be cooked, and "carrier/tray level 3" as the desired placement of the food carrier/tray. The systems and methods of the present disclosure will still provide indication of whether the selected carrier/tray level is safe or unsafe, so long as the identification and carrier/tray level(s) of other food cooking in the cooking device have likewise been entered.

BRIEF DESCRIPTION OF THE DRAWINGS

Further features, advantages and details of the present disclosure will become apparent from the following description of the drawings in which:

FIGS. 10 and 11 show two embodiments that reduce or eliminate the possibility of cross-contamination according to the systems and methods present disclosure.

DETAILED DESCRIPTION OF THE DISCLOSURE

Figure 1:
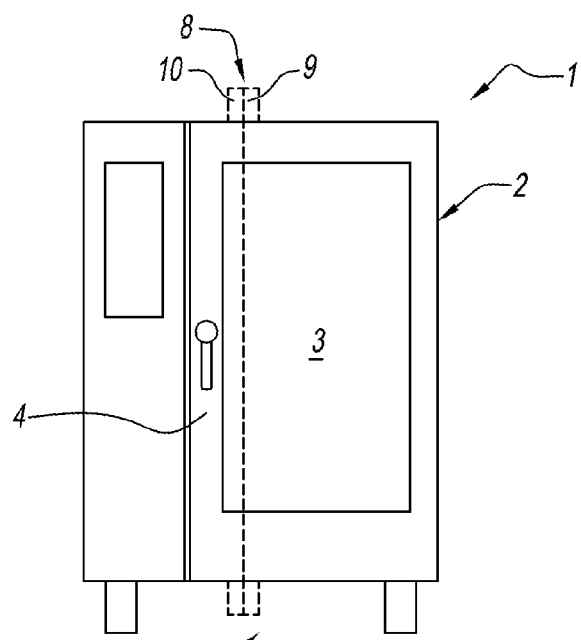
FIG. 1 shows a schematically simplified front view of a cooking device that can be used in the systems and methods of the present disclosure.

FIG. 1 shows a front view of the general configuration of a cooking device 1 that can be employed in the present disclosure. More especially, cooking device 1 can be a cooking device for commercial use, such as e.g., a combisteamer, a baking oven or a microwave oven. The cooking device 1 comprises a housing 2 including a cooking chamber 3 that can be accessed and closed by a door 4. The cooking device 1 further comprises a system 8 that is depicted in a highly-simplified manner as two blocks, one comprising a distance sensor 9 and the other comprising a camera 10. As depicted in FIG. 1, system 8 can be configured to be at or near the top of cooking device 1 with distance sensor 9 and camera 10 in close proximity to each other. Alternatively, at indicated in FIG. 1 by the element "8" having a dashed arrow associated with it, system 8 can be configured to be at or near the bottom of cooking device 1 with distance sensor 9 and camera 10 in close proximity to each other.

Preferably, system 8 of cooking device 1 includes a single distance sensor 9 and a single camera 10, and distance sensor 9 is used only to detect the level of placement of a carrier/tray that is carrying a food product to be cooked within cooking chamber 3 of cooking device 1. This aspect of the present disclosure is particularly relevant for larger cooking devices that can be loaded with a plurality of food product carriers/trays so that different food products can be cooked in a "rolling" process at, inter alia, different levels for different times in cooking chamber 3. For this purpose, it is important to detect the level of cooking device 1 where each food has been placed in order to be able to monitor safe and unsafe carrier/tray levels at a required time. This is accomplished by the system conducting a comparison of the data of the different placement level(s) and associated remaining cooking times during the food product loading process.

Also preferably, in the system which comprises both distance sensor 9 and camera 10 of system 8 of cooking device 1 according to the present disclosure, in turn, camera 10 only captures a series of product images during the loading step for food product to be cooked. This captured image information is correlated with carrier/tray level(s) data that is only obtained from distance sensor 9. The correlated data is stored in the memory of the controller, which will be explained in detail with respect to the descriptions of other Figures. In another embodiment, the information from distance sensor 9 can also be used for adjusting the focus of camera 10, if necessary or desired, as explained in more detail below. Cooking device also has a display panel 15 that serves various functions, including displaying remaining time(s) in cooking cycle(s)/program(s), image(s) of food products for identification purposes, and may include warning lights or speakers. Display panel 15 may serve other functions as is known to those of skill in the art.

Figure 2:
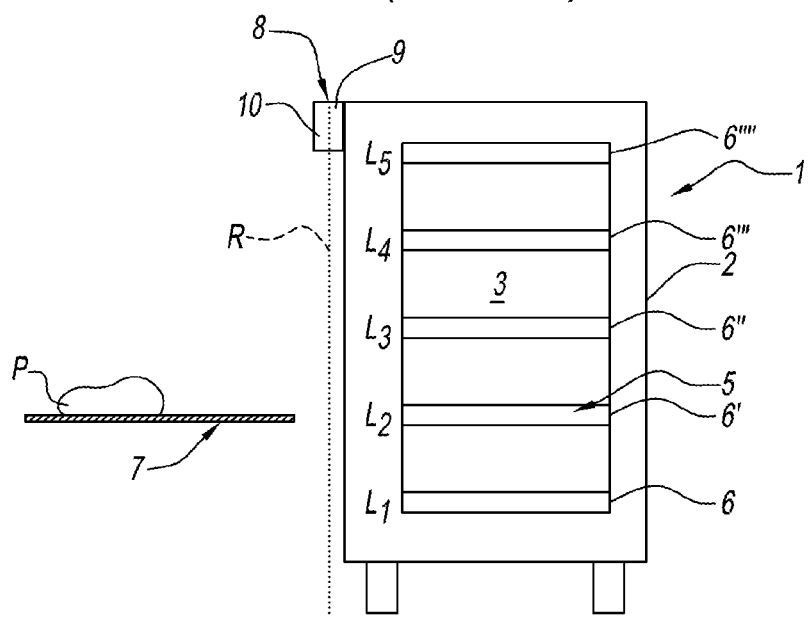
FIGS. 2, 3 and 4 show schematically simplified side sectional views of different embodiments of a cooking device that can be used in the systems and methods of the present disclosure in different loading states, and/or with different positioning of the distance sensor.
Figure 3:
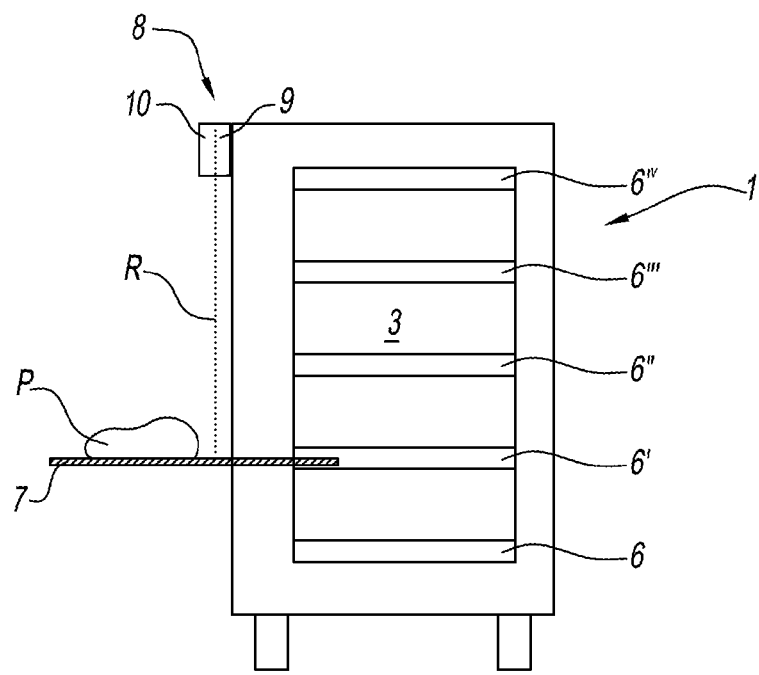
Figure 4:
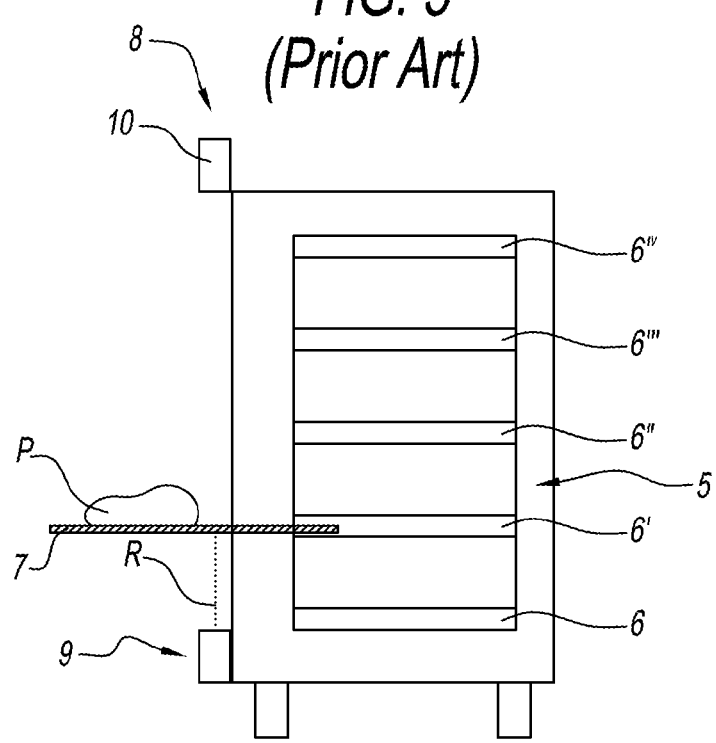

FIGS. 2-4 show that cooking device 1 includes, as the at least one mechanism for receiving and holding at least one food product carrier within cooking chamber 3, a plurality of racks 5 each associated with a plurality of guide rail pairs, in the present case five guide rail pairs 6, 6', 6", 6''' and 6'''', disposed at different levels within cooking chamber 3 (i.e., in FIGS. 2-4 guide rail pair 6 being disposed at the lowest level (L1) of cooking chamber 3, and guide rail pair 6'''' being disposed at the highest level (L5) of cooking chamber 3). Elements 6, 6', 6", 6''' and 6'''' are referred to as guide rail pairs because individual rails comprising the rail guide pair are disposed at opposite sides of the cooking chamber 3 (i.e., from the perspective in FIG. 2, on the left and right internal walls (not shown or numbered) of cooking chamber 3, such that a device engaging the guide rail pair will be disposed substantially perpendicular to the left and right internal wall, and substantially parallel to the bottom and top (also not shown or numbered) of cooking chamber 3. These guide rail pairs receive food product carriers/trays, such as a food product carrier 7, shown in FIGS. 2 to 4, having a food product P thereon.

Also, FIGS. 2 to 4 show a detection beam or detection ray R in the form of a dotted line that is emitted by distance sensor 9. FIG. 2 shows a state of operation of the disclosed system in which food product carrier 7 carrying a food product P is approaching cooking chamber 3 (i.e., in FIG. 2, food product carrier 7 is not yet disposed upon any guide rail pair 6-6''''). In FIG. 3, food product carrier 7 has reached the front edge of guide rail pair 6' such that the detection beam R hits food product carrier 7 resulting in a corresponding signal indicating the level of carrying tray 7 holding food product P upon guide rail pair 6' that is, according to FIG. 2, level L2. This carrier tray 7 level measurement is determined by distance sensor 9 and is stored in the memory of the system, preferably the memory is part of the controller (not shown in FIGS. 2 to 4) of cooking device 3. As mentioned above, distance sensor 9 can be automatically activated by the approaching carrier tray 7, or manually by the operator.

Upon detection of the presence of food product carrier 7 by distance sensor 9, camera 10 is activated (e.g., by a signal received from distance sensor 9), and camera 10 begins to capture image(s) of food product P on food product carrier 7 prior to loading food product carrier 7 into cooking chamber 3. Alternatively, camera 10 may be activated in other ways, which will be discussed with reference to FIGS. 5 and 6, below. The resulting captured image information is stored in the memory of the system in order to be able to: (1) determine the safe and unsafe levels for placement of food carrier 7, and (2) determine whether or not the food carrier tray 7 holding food product P is loaded into a safe or unsafe level of cooking chamber 3. As shown in FIGS. 2 and 3, system 8, with both distance sensor 9 and camera 10 in proximity, can be disposed above and in front of cooking chamber 3. Alternatively, as shown in FIG. 4, distance sensor 9 and the camera 10 can be disposed spaced apart and, for example, distance sensor 9 can be disposed proximal the bottom, and in front, of cooking chamber 3, with the camera disposed proximal the top, and in front, of the cooking chamber 3. The function of distance sensor 9 is not influenced by these various positions. In an alternative embodiment, distance sensor 9 can be disposed on, e.g., a guide rail or other structure (not shown or numbered) and move up and down a long side of door 4. In this embodiment, distance sensor 9 is configured and constructed with means for activating its movement along, e.g., the guide rail, and for positioning adjacent the placement level 6-6'''' of food product tray(s) 7 being placed into cooking chamber 3 of cooking device 1. In this embodiment, the location along the guide rail will determine the level at which carrier/tray 7 holding food product P is located. Distance sensor 9 can be an infrared sensor or an ultrasonic distance sensor. In addition, cooking device 1 can be equipped with an illumination device (not shown) that can be triggered by distance sensor 9 or by a door switch contact (not shown or numbered) to illuminate food product P during the image capture to provide a better field of view for camera 10.

One embodiment of a process according to the present disclosure will now be described with reference to FIG. 5. As is shown schematically in FIG. 5, there are interactions between the operator and the components of the device of the present disclosure. In general, the method includes the following steps.

In step 50, cooking device 3 ("unit" in FIG. 5) is switched on by the operator. Upon switching on the unit, the controls of the unit are also switched on 51 and distance sensor 9 is activated 52. Steps 51 and 52 can either be automatically performed as a result of step 50, as above, or can be separate actions by the operator. Preferably, to avoid mistake and to reduce the number of steps performed by the operator, steps 51 and 52 are automatically performed as a result of step 50. Distance sensor 9 controls and monitors cooking chamber 3, such as opening door 4 and the approach of food product carrier 7 holding food product P for loading into cooking chamber 3.

When food product carrier 7 is going to be inserted in step 53 into cooking chamber 3, distance sensor 9 measures the level of food product carrier 7 as it is placed onto, e.g., a guide rail pair 6, 6', 6", etc. The level of food product carrier 7 is delivered to the controller (not shown or numbered) associated with cooking device 1. This food product carrier 7 level information is stored in the controller data base in step 54. In conjunction with (e.g. before, concurrently or after) the storage of the level of food product carrier 7 intended placement in cooking chamber 3, camera 10 is activated in step 55 (preferably automatically) and, also preferably, the focus of camera 10 is adjusted in step 56 (also preferably automatically) according to the measured height/level of food product carrier 7 and camera 10 captures at least one, and preferably a series, of images of food product P in step 57 on food product carrier 7. Camera 10 is preferably automatically activated either by being triggered by distance sensor 8 (as soon as same detects the presence of food product carrier 7) or by a door contact switch (not shown or numbered). The captured images of food product P are stored in an associated memory, as mentioned above and described in more detail below.

Next, the captured image, or series of captured images, of food product P is delivered to the controller in step 58, and the controller selects the captured image(s) with the best quality in terms of food product P recognition in step 59 (i.e., in terms of clarity, color, etc.). The selected captured image(s) is then compared in step 60 by the controller to previously taken images which are stored in a database. The database of previously taken images can be stored as part of the controller or memory (not shown or numbered) of cooking device 1, or can be stored as part of a remotely located memory/storage device. Also, the previously taken image(s) can be of food product previously cooked in the same cooking device 1 or from a compilation of food product previously cooked in other cooking devices 1 at the same or similar faculties, or of "stock" photographs of food product P.

Next, food product P is identified in step 61 by the comparison of the captured image(s) to the stored image(s). Cooking device 1 displays a photograph, pictogram, text information or other food product P description information on a display in step 62 (not shown or numbered in FIG. 5) as a result of the comparison and identification. Optionally, if the comparison of the captured image(s) with the stored image(s) does not permit a clear recognition of food product P, the two stored food product image(s) "best fitting" food product P captured image(s) are shown on the display in step 63. In this latter case, the operator manually selects the correct identification food product P to be cooked, or a correct cooking program needs to be started manually.

The memory (not shown) of the controller of cooking device 1 also has stored cooking cycles/programs (cooking temperatures, heat/steam portions of cooking cycles/programs, if any, cooking times) for food products P (both food product type and number) and food product level placement in cooking device 1. Associated with each cooking cycle/program is an HSCT for the identified food product P. If food product P is the first food product P to be placed in cooking device 1 or if more than one level will be occupied initially at the beginning of use of cooking device 1, the HSCT for that/those food product(s) P is of no concern. However, if other food product(s) P is/are in active cooking cycles/programs, the HSCT associated with a new food product P to be placed in cooking chamber 1 is compared to remaining cooking times for each food product(s) P that is/are in cooking device 1 at a level 6-6"" below an open/unoccupied level. Depending on the parameters set by a particular user for the number of cooking levels below an empty cooking level that are to be evaluated for a determination of safe and unsafe cooking level(s), the controller compares the HSCT associated with the food product P that is to be cooked with the remaining time(s) for the set number of cooking level(s). Each cooking time for a food product P on a level 6-6''' (in the embodiment shown in FIGS. 2-4) below the level where food product P is intended to be placed, is compared to the HSCT associated with the food product P that is to be cooked. Those cooking time(s) for food product(s) P that are greater than the HSCT will allow for the empty level(s) above such food product P to be designated safe, while those cooking time(s) for food product(s) P that are less than the HSCT will require the empty level(s) above such food product P to be designated unsafe. The method and system of the present disclosure enables the output of a warning if the comparison indicates unsafe. Two embodiments of possible "warning" types will be discussed in conjunction with FIGS. 8-9.

Figure 5:
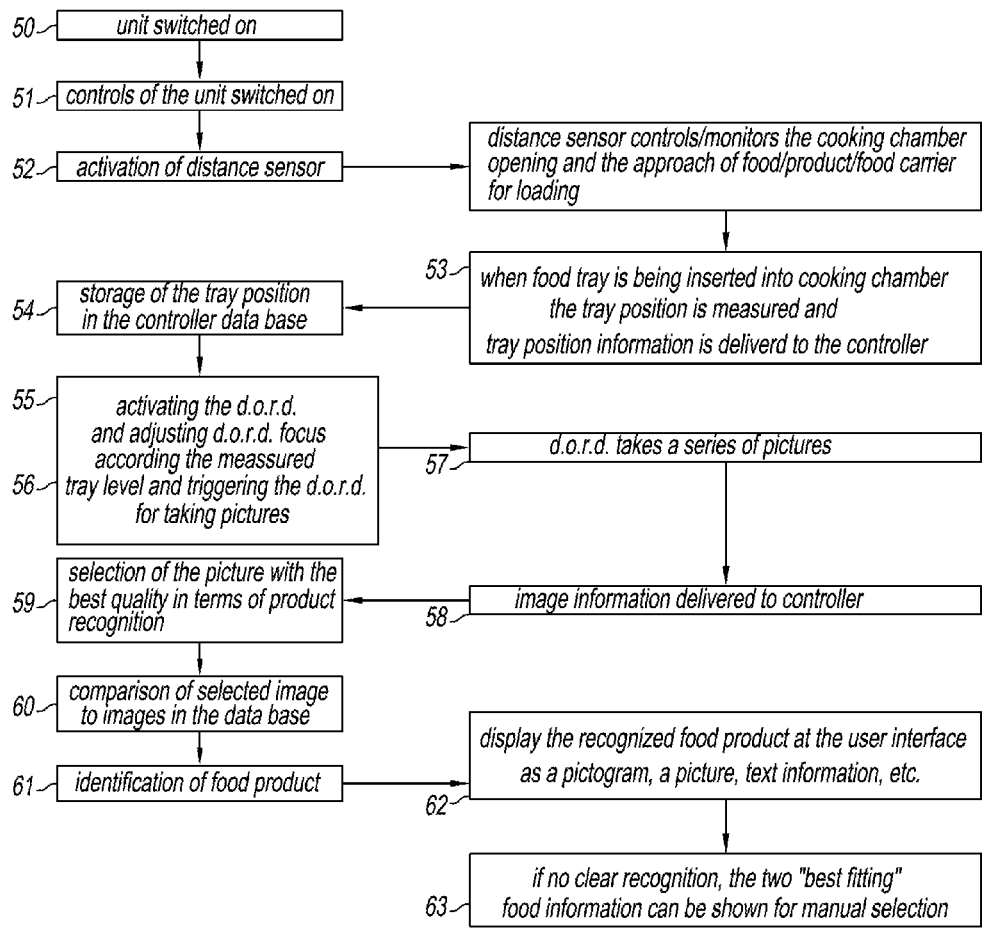
FIGS. 5 and 6 shows schematically a process of the present disclosure, with one embodiment of the process steps set forth.
Figure 6:
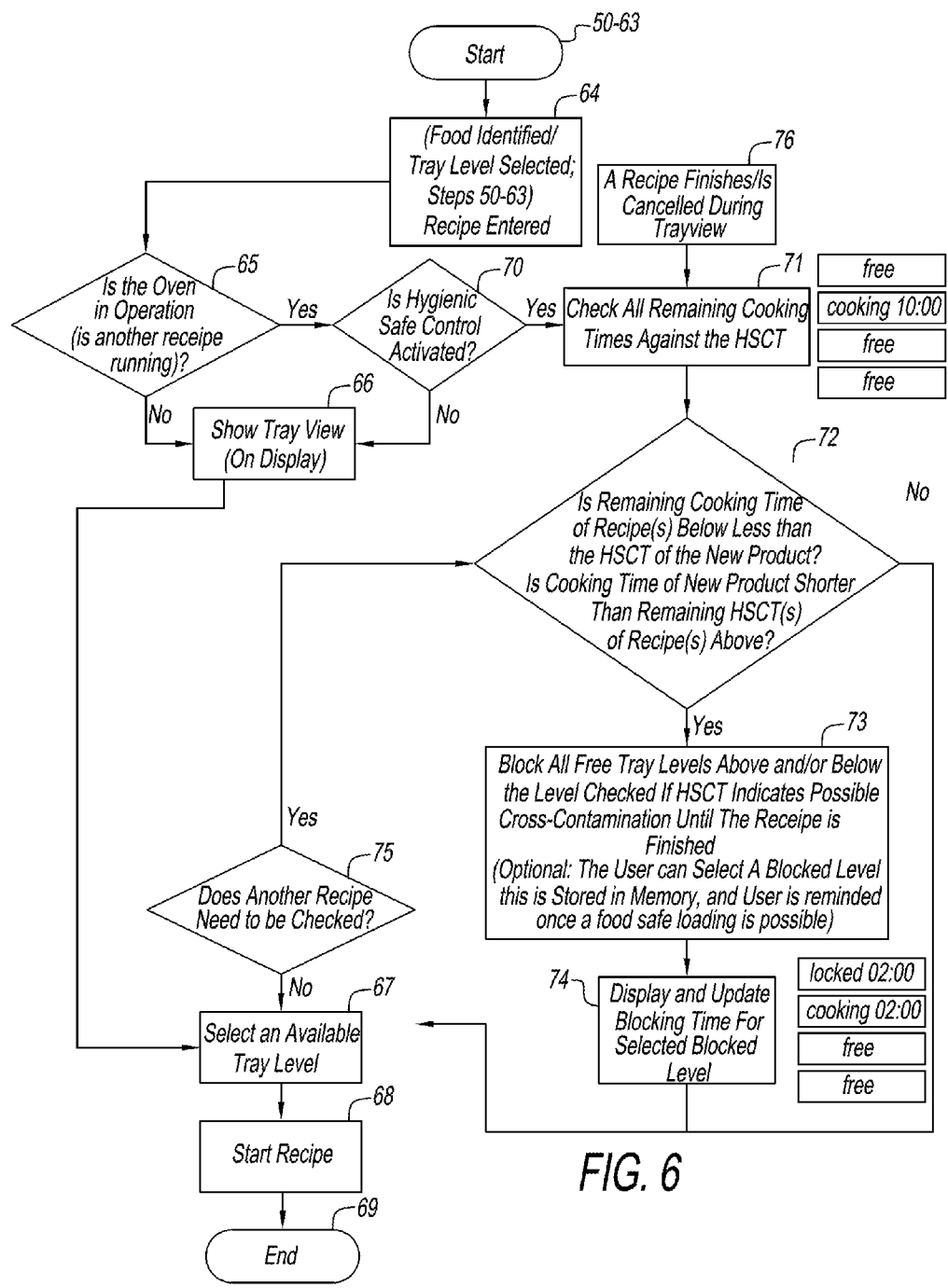

Referring now to FIG. 6, the "Start" indicates that steps 50-63 described in the discussion of FIG. 5 are already completed. Thus, as the method and system proceeds to perform the steps of FIG. 6, the cooking device 1 has been started, the desired tray level (6'-6"") has been determined, and the food product P has been identified. The method and system for determining safe and unsafe tray level(s) L begins at step 64. In step 64, the cooking cycle/program is selected. As mentioned above, each cooking cycle/program has associated with it an HSCT. After the selection of the cooking cycle/program in step 64, the process proceeds to a decision point at step 65. At decision point step 65, the method and system determines the answer to the question: "Is the cooking device 1 in cooking mode (i.e. is another recipe running)? If the method and system determines that the answer to this question is "No", the process proceeds to step 66. In step 66, available cooking levels L are determined and displayed. The display of available cooking levels I can be shown on user interface 15, or on the cooking levels 6'-6"" themselves, or on an indicator associated with each cooking level 6'-6"". In the situation where cooking device 1 is not in the cooking mode, all tray levels L will be available. The process then proceeds to step 67 where any available tray level L can be selected since cooking device 1 had no cooking cycles/programs running in this instance. The selected tray level is then stored in the memory of the controller. Thereafter, the process continues to step 68 where the cooking cycle/program for food product P is started and in step 69 the process ends. At decision point step 65, where the method and system determines the answer to the question: "Is the cooking device 1 in cooking mode (i.e. is another recipe running)?, if the method and system determines that the answer to this question is "Yes", the process proceeds to decision point step 70. At decision point step 70, the method and system determines the answer to the question: "Is hygienic safe control activated?" If the method and system determines that the answer to this question is "No", the process continues again to steps 66-69. In some types of cooking, such as baking, HSCT would not be a cooking parameter, because there are usually no food juices that would drip from one cooking level to another. Also, in some cooking processes, the food is not cooked all the way to 100% completion in the cooking device (oven), but is completed in another device to its end. In these situations, having the HSCT inactivated is merely a faster way to deselect HSCT than setting all HSCTs to 0. At decision point step 70, where the method and system determines the answer to the question: "Is hygienic safe control activated?", if the answer to this question is "Yes" the process proceeds to step 71.

At step 71, the controller can check the remaining cooking times in cooking cycle/programs for products P in cooking device 1 at all levels L below the cooking level L determined in steps 50-63 for product P to be cooked against the HSCT. However, in practice, it is preferable to check the remaining cooking time only on the level immediately below the cooking level L determined in steps 50-63 for product P to be cooked against the HSCT, because if this level L has a cooking time that is longer than the HSCT, then any dripping from food product P to be cooked will fall onto it. The process then proceeds to decision point step 72. At decision point step 72, the method and system determines the answer to the question: "Is the remaining cooking time of the cooking cycle/program for product P at the level L in cooking device 1 below the level L determined in steps 50-63 less than the HSCT?" The method and system then checks the time remaining in the checked cooking cycle/program against the HSCT, and determines if the time in the checked cooking program is less than the HSCT. If the method and system determines that the answer to this question is "Yes", the process proceeds to step 73. In step 73, all free tray levels L above the tray level checked are blocked until the cooking cycle/program is complete. It should be noted that in step 73, if the product P to be cooked is deselected, or a new product P to be cooked is selected, the process set forth in FIG. 6 returns to step 64, and the HSCT calculations are repeated. As mentioned above, the process is flexible in that the controller can be programmed to check all tray levels below the tray level determined in steps 50-63, or a subset of all the levels, e.g., only the tray level immediately below the tray level L determined in steps 50-63. Also as mentioned above, it is preferable to check only the level L immediately below the selected level L. In an additional preferred aspect, the level L above the selected tray should also be checked as loading a "short" recipe, i.e., one having a short cooking time, below a level L where a product having a "long" HSCT is running could lead to cross-contamination of the product having the "short" cooking time. Also, optionally, the user can select one or more blocked levels L and the selected level(s) will be stored in the memory of controller. Once safe loading of food product P in the selected and stored level(s) L is possible, an indication (e.g., audible or visual) will be provided so that the operator will be made aware of safe loading availability for the selected level(s). This latter option is shown in step 74 where the time remaining for the selected tray level(s) is/are displayed and updated. This option will be discussed in more detail in conjunction with FIG. 11.

At decision point step 72, where the method and system determines the answer to the question: "Is the remaining cooking time of the cooking cycle/program for product P at level L in cooking device 1 below the level L determined in steps 50-63 less than the HSCT?" If the answer to this question is "No", the process proceeds to decision point step 75. At decision point 75, the method and system determines the answer to the question: "Is there another running cooking cycle/program to check?" This would be the case where the controller is programmed to check more than one level L below the level determined in steps 50-63. If the method and system determines that the answer to the question is "Yes", the process loops back to decision point 72 for the next to check the next cooking cycle/program at the next level L. At decision point 75, where the method and system determines the answer to the question: "Is there another running cooking cycle/program to check?" If the method and system determines that the answer to the question is "No", the process then continues again to steps 67-69. In FIG. 6, there is a notation of an "Event" as step 76. What this means is that if, for example, during step 71 where cooking time(s) for the tray level(s) L a cooking program/cycle finishes or is cancelled, all remaining cooking times must be checked again. Other "Events" may occur at any point in the process that calls for the need to have remaining cooking times to be checked again.

Figure 7:
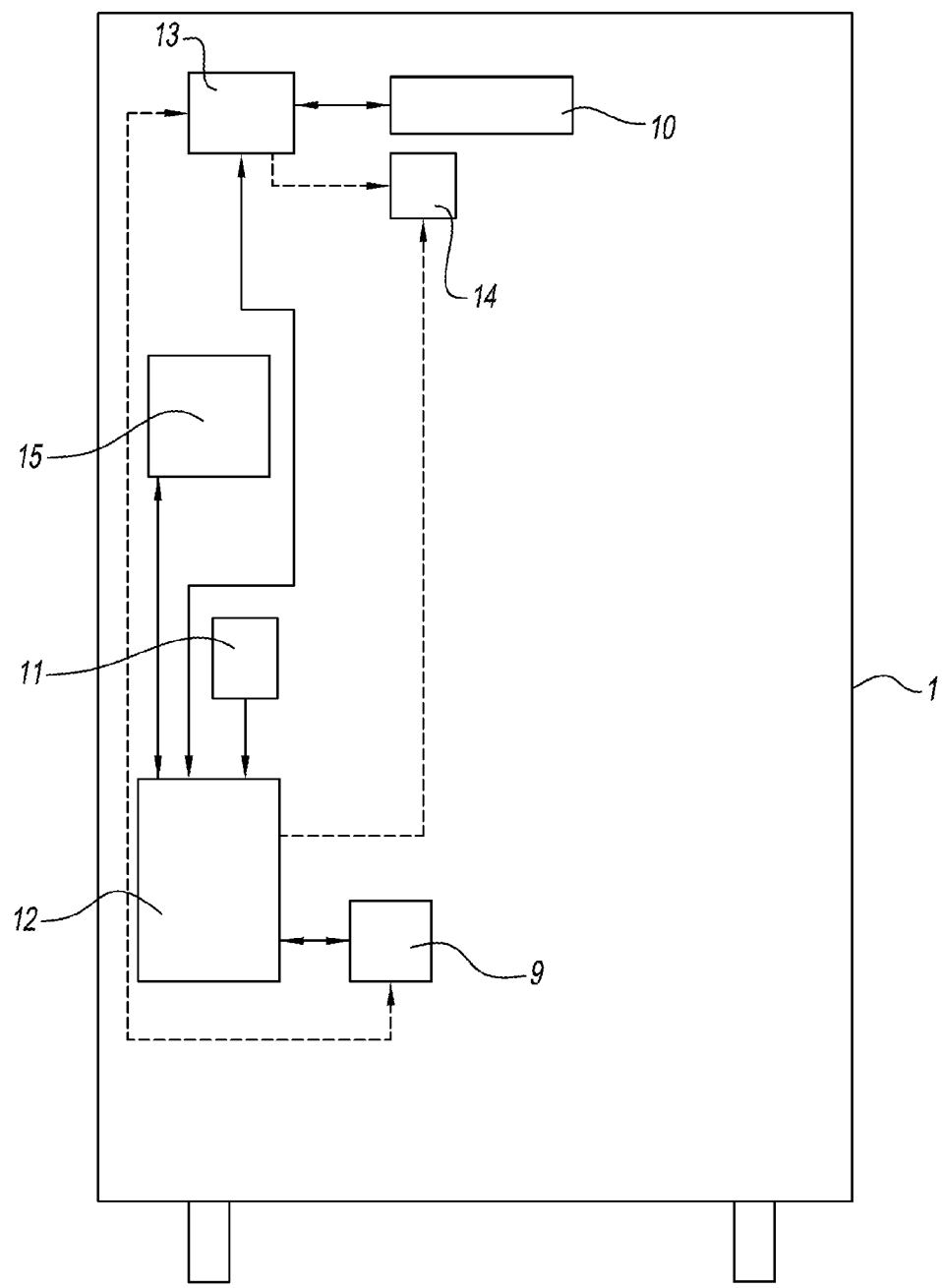
FIG. 7 shows schematically a control system for the systems and methods of the present disclosure, with one embodiment of the control system set forth.

One embodiment of the components of cooking device 1 will now be discussed with reference to FIG. 7. FIG. 7 shows schematically the components of a method and system according to the present disclosure. The size and spatial relationships of the components described with respect to FIG. 7 are merely exemplary for ease of discussion. In accordance with FIG. 7, distance sensor 9 and DORD 10 comprising system 8 will be discussed in combination with cooking device 1 that is a combisteamer. A main switch 11 is activated that, in turn, activates controller 12. Controller 12 controls all cooking functions, such as time and temperature of the cooking cycle/program. Controller 12 also activates distance sensor 9 (however, as mentioned above, distance sensor 9 may be manually activated). As can be seen from the bi-directional arrow between controller 12 and distance sensor 9, once activated, distance sensor 9 recognizes that food product P is being placed into cooking device 1, sends distance information to controller 12 and that information can be stored in memory of controller 12 or in a separate memory or data base, for several functions. These functions include controller 12 providing the cooking cycle/program for food product P loaded into cooking device 1.

As can also be seen in FIG. 7, controller 12 also activates a control 13 that controls DORD (DORD) 10 and, if present, a light 14. Alternatively, controller 12 may activate DORD 10 and light 14 directly. Controller 12 also has access to stored images of various food product types, both cooked and uncooked, and quantities of the same, and it is control 13 that performs the comparison of food product images captured by DORD 10 with the stored food product images. Control 13 may be included as part of controller 12 but, in any event, control 13 is specifically for food product recognition. As food product images are captured by DORD 10, that information is relayed to control 13 (as indicated by the bi-directional arrow between control 13 and DORD 10), and the product identification made by control 13 is relayed to controller 12 (indicated by bi-directional arrow between control 13 and controller 12). Controller 12 selects the cooking cycle/program for the identified food product P, and sends that information to a user interface 15. User interface 15 includes, e.g., a touch screen and/or a display for providing information, such as product recognition information and cooking cycle/program, to the operator. Also as indicated by the bi-directional arrow between user interface 15 and controller 12, those components are interactive with each other. This interaction is useful in the case where, for example, the operator needs to override the cooking cycle/program because the product recognition is incorrect. In this case, the operator selects the food product and cooking cycle/program and this information is sent to controller 12 so that the proper cooking cycle/program is selected.

Figure 8:
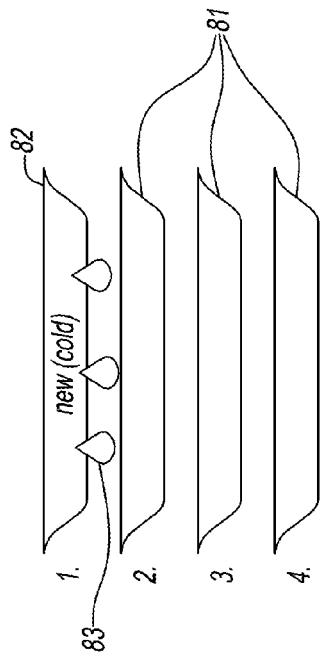
FIG. 8 shows a schematic of the general problem of cross-contamination.

FIG. 8 shows a generalized instance of how cross-contamination can occur. In FIG. 8, food product carrier/trays 81 containing food product P are in cooking levels 2-4. A new (cold) food product carrier/tray 82 is inserted into cooking device 1 above cooking food product P in carriers/trays 81 in levels 2-4. Condensate 83 can drip from the new (cold) food product carrier/tray 82 downward onto food product tray carriers 81 in levels 2-4. If the cooking time remaining for cooking food products P in trays carriers/trays 81 is insufficient to kill or render harmless any pathogens in condensate 83, cross-contamination can occur.

Figure 9:
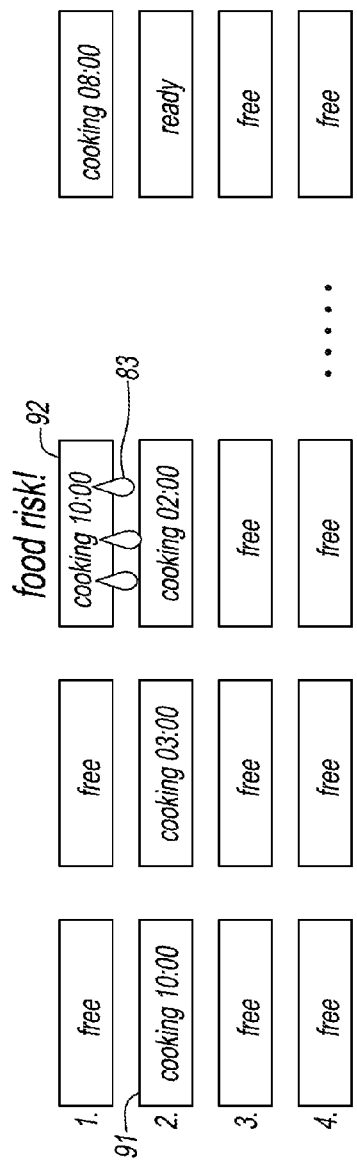
FIG. 9 shows a practical situation of where cross-contamination can occur in cooking systems currently in use.

FIG. 9 is similar to FIG. 8, but shows a practical situation in which cross-contamination can occur and create food risk. In FIG. 9, a food product P 91 is cooking in level 2. At the initial time being considered in FIG. 9, food product P 91 cooking in level 2 has 10 minutes remaining cooking time. As time progresses in FIG. 9, the food product P 91 has 3 minutes and 2 minutes cooking time remaining, respectively. The point in time when a food product P 92 is placed in level 1, food product P 91 cooking in level 2 has only 2 minutes cooking time remaining. On the other hand, food product P 92 being placed into level 1 has a HSCT of 10 minutes. The food product P 91 has insufficient cooking time remaining, creating a cross-contamination risk from condensate 83 dripping from fruit product P 92 onto food product P 91. As can be seen at the right-hand side of FIG. 9, when food product P 91 is ready to be removed from cooking device 1, 8 minutes of HSCT remains for food product P 92. On the other hand, placement of food product P 92 having an HSCT of 10 minutes into cooking device 1 in level 1 at the beginning of timeline 93 in FIG. 9, no food no cross-contamination risk would have been created because food product P 91 had 10 minutes cooking time remaining, which is equal to the HSCT of food product P 92. Moreover, cooking levels 3-4 were available and placement of food product P 92 in either of levels 3-4 would have avoided the risk of cross-contamination.

FIG. 10 shows a practical application of the methods and systems of the present disclosure. In FIG. 10, a food product P 91 similar to that in FIG. 9 is cooking in level 2. At the initial time considered in FIG. 10, food product P 91 has 10 minutes cooking time remaining as seen in column 101. With respect to FIG. 10, if a food product P to be cooked (not shown) has an HSCT of 2 minutes, level 1 is "safe", and therefore free, when food product P 91 has remaining cooking times of 10 minutes and 3 minutes as indicated in columns 101 and 102, respectively. In column 103, food product P 91 has only 2 minutes of remaining cooking time. At this time, cooking level 1 is locked in accordance with the methods and systems of the present disclosure. When food product P 91 is "ready" to be removed from cooking device 1, i.e., the cooking cycle/program is complete, as shown in column 104, then cooking level 1 is "safe", and free to receive a food product P (not shown), having an HSCT of 2 minutes.

FIG. 11 shows an alternative embodiment, where the operator can select a "locked" cooking level L and receive a reminder (visual and/or audible) according to the methods and systems of the present disclosure. This alternative is discussed also above in conjunction with steps 71-74 shown in Figure 6. In accordance with FIG. 11, food product P 91 is cooking in level 2. Cooking level 1 is "locked" and has 23 seconds of locked time remaining, corresponding to the remaining cooking time of food product P 91. User 111, selects cooking level 1 and the indicator for cooking level 1 changes, e.g., changes color to show that it is unavailable. When cooking level 1 becomes available as shown in column 104, operator 111 receives indication that cooking level 1 is now safe and free for placement of food product P (not shown).

Certain parameters for the system and method according to the present disclosure may be adjusted by a particular user in a particular situation. For example, as mentioned above, the system and method may be adjusted so that a specific number of carrier/tray level(s) L below food cooking in cooking device 1 are used to determine whether a level L above may be potentially characterized as "unsafe". In this regard, the system and method according to the present disclosure may provide for only one (1) carrier/tray level L below the level L of any food product P being placed in cooking device 1 be used to determine whether the level L of a food product being placed in cooking device 1 is "unsafe". Of course, on the other hand, the system and method according to the present disclosure may provide for the situation that a plurality or all carrier/tray levels below the level of food product being placed in cooking device may be evaluated. Also, it will be necessary to define how long a hygienic risk will be selected. The present disclosure provides flexibility in selecting/setting an HSCT. For example, rather than the remaining cooking time for food product P in lower cooking levels in cooking device one, other cooking parameters (or the trends of same), such as cooking chamber 3 temperature, food product P core temperature, cooking chamber 3 humidity, etc. may be selected. In addition, any particular HSCT, as discussed above, can be merely a matter of user choice. Any number of different values/conditions may be considered when a particular user adjusts an HSCT for that user's system and method.

As mentioned above, the preferred systems and methods in accordance with the present disclosure comprise both a DORD and a distance sensor. An especially preferred system is described in U.S. Provisional Application Nos. 61/604,805 and 61/644,820, both filed on May 9, 2012, and U.S. patent application Ser. No. 13/886,999, filed on May 3, 2013, all of which are incorporated herein in their entirety by reference thereto.

In the preferred systems and methods comprising both a distance sensor and a DORD, the DORD captures of images of the food product to be cooked for the purposes of food product recognition and of the selection of a cooking cycle/program and HSCT, and the distance sensor detects the position of the food product placed in the cooking device. Once the food product is recognized, the operator of the cooking device is provided the correct cooking cycle/program and HSCT for the food product to be placed in the cooking device.

Depending on the configuration of the systems described herein, either the distance sensor or the DORD, or both, can be located inside or outside of the cooking chamber. Although generally, and specifically in the embodiments discussed above, the distance sensor and the DORD are described, for convenience sake, as located outside to the cooking device, it will be apparent based on the detailed description above that either of these devices, or both, may be located inside the cooking chamber. While the location inside the cooking chamber will likely entail some modifications to the distance sensor and/or DORD (due to higher temperatures and/or higher humidity, for instance), such modifications are well within the ability of those of skill in the art.

The term DORD as used in the present disclosure includes optics and means for electronic evaluation of the objects observed by the optics. The term DORD encompasses means "for recognizing food to be cooked". In other words, the 'recognizing' is generally by the outer appearance of the food product itself. Optical means that do not recognize the food product itself (for example, identification means in which an image of a symbol plate or of a bar code is captured, or in which identification of an RFID tag is made, etc.) are not meant to be within the scope of the wording DORD, and are specifically excluded therefrom.

In accordance with the present disclosure, the DORD generally comprises a digital imaging device (although an analog DORD may be used), for capturing one or more images of the food product before cooking, especially an electronic image sensor, such as a CCD sensor or a CMOS sensor. An "image" in the context of the present disclosure may be a single image, or a series of images, such as a video. The DORD may comprise a controller having access to image data, i.e., pictorial or video "captures" of food to be cooked. Thus, a controller is provided and may be considered as part of the DORD. The controller has access to the image data, i.e. the digital data that embodies the image of the food product to be cooked that is calculated from the image (even of an analog image) taken of the food product to be cooked.

It is preferred but not necessary that the DORD is provided wherein the image data will be in digital format from the beginning. This, however, is the easiest way for the image data to be further evaluated, analyzed and/or processed. The image data can be stored in data storage, or can be accessed directly by the controller. In an alternative embodiment, the image data can be in non-digital (e.g., analog) form, and it is then necessary to convert the image data to digital form. For example, colors can be calculated into shades of grey (that have been previously assigned digital values) and then analyzed digitally.

The distance sensor may be provided with a means to activate a light source for lighting a field of vision of the DORD. By activating a light source, reproducible and more accurate results can be attained by the DORD. Therefore, in a preferred embodiment, a controller and a DORD are provided, wherein controller comprises means to activate a light source lighting a field of vision of the DORD, either by activating the distance sensor to do so, or by directly doing so.

The DORD may be (but as mentioned above, not exclusively) located outside of the cooking chamber, preferably directly above or displaced laterally above a door that provides access to the cooking chamber. From there, the DORD has a reliable view of any food product that is going to be placed into the cooking chamber. Also, in normal operation, any food product on a carrier/tray will normally be oriented horizontally directly in front of the carriers/trays rack onto which it will be placed, or in terms of relation to the DORD, generally more or less perpendicular to the field of view. This position is preferable for reliably gaining an image angle towards the food product. If the DORD is located at the cooking device door, it will also have a good view of carrier/tray level indicators, as mentioned above.

In an alternative embodiment, the DORD can be mounted on an extendable and retractable holder that extends when the cooking device door is opened and that retracts when the cooking device door is closed. It will be appreciated by those of skill in the art that this is another way to gain a good angle of view of the food product to be cooked. In a more specific, and in some cases preferred, embodiment the DORD is mounted on moving means in a manner that permits food product to be imaged from two different angles. An embodiment such as this makes it easy to gain more optical information about the, thereby increasing the probability that the correct identification of the food product can be determined.

In addition to the DORD already described above, in another embodiment a second, or more than a second, DORD can be provided. It will be appreciated by those of skill in the art that everything described above for the first DORD would also be applicable for a second or more than a second DORD.

In the above detailed description, the specific embodiments of this disclosure have been described in connection with its preferred embodiments. However, to the extent that the above description is specific to a particular embodiment or a particular use of this disclosure, this is intended to be illustrative only and merely provides a concise description of the exemplary embodiments. Accordingly, the disclosure is not limited to the specific embodiments described above, but rather, the disclosure includes all alternatives, modifications, and equivalents falling within the true scope of the appended claims. Various modifications and variations of this disclosure will be obvious to a worker skilled in the art and it is to be understood that such modifications and variations are to be included within the purview of this application and the spirit and scope of the claims.

All of the patents, publications and other documents referred to herein are incorporated herein in their entirety as if fully set forth verbatim herein.

What is claimed is:

1. A system for reducing or eliminating cross-contamination between food to be cooked in a cooking device and food cooking in the cooking device, the system comprising:
   a controller having a memory, wherein the memory stores a hygienic safe control time (HSCT) for the food to be cooked, and wherein the memory stores cooking times, remaining cooking times and carrier/tray levels for each food cooking in the cooking device;
   and
   a user interface including a display and user input device, wherein the system:
      receives an identification of the food to be cooked via the user input device of the interface;
      obtains a hygienic safe control time (HSCT) for the food to be cooked from the memory;
      obtains a remaining cooking time and a carrier/tray level for each food cooking in the cooking device from the memory;
      compares the HSCT to each remaining cooking time, wherein the controller performs the comparison; and
      identifies safe carrier/tray level(s) for accepting placement of the food to be cooked, wherein the controller performs the identification.

2. The system according to claim 1, wherein the system provides the identification of safe carrier/tray level(s) for accepting placement of the food to be cooked on the display of the user interface.

3. The system according to claim 1, wherein the system further provides an alert to a user if food to be cooked into the cooking device is attempted to be loaded at an unsafe carrier/tray level.

4. The system according to claim 1, wherein the system further comprises a locking mechanism configured to lock one or more unsafe carrier/tray levels so that food to be cooked cannot be placed on the one or more locked unsafe carrier/tray levels.

5. The system according to claim 1, wherein the system displays identified safe carrier/tray level(s) on the user interface.

6. The system according to claim 1, wherein the system locks unsafe carrier/tray level(s).

7. The system according to claim 1, wherein the system provides a warning that an unsafe carrier/tray level is attempted to be used.

8. The system according to claim 1, wherein system identifies the carrier/tray level in the cooking device at which food to be cooked is going to be placed.

9. The system according to claim 2, wherein the system identifies the carrier/tray level by capturing an image of a carrier/tray level indicator or by an auto-focus mechanism.

10. The system according to claim 4, wherein the HSCT is fixed for all food to be cooked in the cooking device.

11. The system according to claim 4, wherein the HSCT is different for each food to be cooked in the cooking device.

12. The subsystem according to claim 5, further comprising causing the processor to perform the action of displaying the safe carriers/trays levels on the user interface.

13. The subsystem according to claim 6, further comprising causing the processor to perform the action of locking unsafe carrier/tray level(s).

14. The subsystem according to claim 7, further comprising causing the processor to perform the action of providing a warning that an unsafe carrier/tray level is attempted to be used.

* * * * *